United States Patent
Tamam et al.

(10) Patent No.: US 6,686,834 B1
(45) Date of Patent: Feb. 3, 2004

(54) TAXI METER HAVING DISCRIMINATING MEANS FOR ELIMINATING ERRONEOUS INPUTS

(76) Inventors: Amos Tamam, 45 Bayview Ave., Great Neck, NY (US) 11021; Arie Klebaner, Nisan 5A, Tel Aviv 69715 (IL)

( * ) Notice: Subject to any disclaimer, the term of this patent is extended or adjusted under 35 U.S.C. 154(b) by 0 days.

(21) Appl. No.: 09/302,504

(22) Filed: Apr. 30, 1999

(51) Int. Cl.[7] .............................................. G08B 21/00
(52) U.S. Cl. ........................ 340/434; 705/417; 705/418
(58) Field of Search ............................ 377/24, 28, 30; 235/30 R; 705/417, 418; 340/434

(56) References Cited

U.S. PATENT DOCUMENTS

| | | | | |
|---|---|---|---|---|
| 3,818,186 A | * | 6/1974 | Harwood | 235/30 R |
| 3,860,806 A | * | 1/1975 | Fichter et al. | 705/417 |
| 3,970,827 A | * | 7/1976 | Ikuta et al. | 235/30 R |
| 4,045,656 A | * | 8/1977 | Scott | 377/24 |
| 4,212,069 A | * | 7/1980 | Baumann | 705/418 |
| 4,217,484 A | * | 8/1980 | Gerst | 377/24 |
| 4,387,299 A | * | 6/1983 | Akiyama | 250/231.14 |

* cited by examiner

*Primary Examiner*—Sam Rimell
(74) *Attorney, Agent, or Firm*—Howard C. Miskin, Esq.; Gloria Tsui-Yip, Esq.

(57) ABSTRACT

A taxi meter system mounted on a taxicab for accurately computing a fare for a taxicab trip as function of time and distance is disclosed. The system provides discrimination means that eliminate the contribution to the fare that may otherwise be created by illegal means that degrade the performance of the taxi meter system.

12 Claims, 4 Drawing Sheets

TAXI METER HAVING DISCRIMINATING MEANS FOR ELIMINATING ERRONEOUS INPUTS

BACKGROUND OF THE INVENTION

1.0 Field of the Invention

The invention relates to a taxi meter system that computes the fare for a trip in a taxicab as a function of distance and time and, more particularly, to a taxicab system having means for detecting erroneous inputs that would otherwise cause for erroneous calculations of the fare.

2.0 Description of the Related Art

Taxicab businesses are highly interactive with the general public, and as such, are regulated to provide penalties so as to prevent the public from being mistreated. One such mistreatment is the incorrect calculation of the fare for the taxicab ride.

Taxicab businesses have recently employed digital devices having a computer therein serving as a computational means so as to automatically provide accurate fee calculations without any intervention from the taxicab driver. However, some taxicab drivers employ a so called "zapper" or deceiving system that disrupts the taxicab meter system so as to illegally increase the fare paid by the rider of the taxicab. It is desired that a taxicab meter system be provided that has means to detect erroneous inputs from the deceiving systems that would otherwise cause higher and inaccurate fare calculations.

OBJECTS OF THE INVENTION

It is the primary object of the present invention to provide for discriminating means for use in a taxi meter system that detects erroneous inputs resulting from the undesired contributions from external devices that would otherwise contribute to higher and inaccurate fare calculations.

It is another object of the present invention to provide for a taxi meter system that also provides for alarm conditions upon the detection of erroneous and illegal inputs to the taxi meter system.

It is another object of the present invention to provide for discriminating means for use in a taxi meter system that eliminates the undesired contributions from external devices.

It is another object of the present invention to provide for a taxi meter system that not only calculates accurate fares, but also provides for alarm conditions upon the detection of erroneous and illegal inputs to the taxi meter system.

SUMMARY OF THE INVENTION

The invention is directed to a system mounted on a taxicab for accurately computing the fare for a taxicab trip as a function of distance and time. The system comprises means for generating true pulses each representative of the actual distance and time traveled by the taxicab. Means for receiving the true pulses as well as receiving false pulses erroneously representing the distance and time traveled by the taxicab. The system further comprises means for dividing the number of true and false pulses by a predetermined amount and providing an output therefrom representative of the number of true and number of false pulses received. The system further comprises discriminating means for receiving the output of the means for dividing and detecting the presence of false pulses from the output thereof. The system further comprises visual or audio alarm means for indicating the detection of said false pulses. The system further comprises processing means for registering the detection of said false pulses.

BRIEF DESCRIPTION OF THE DRAWINGS

A better understanding of the present invention may be realized when considered in view of the following detailed description, taken in conjunction with the accompanying drawings.

DETAILED DESCRIPTION OF THE PREFERRED EMBODIMENTS

Figure 1:
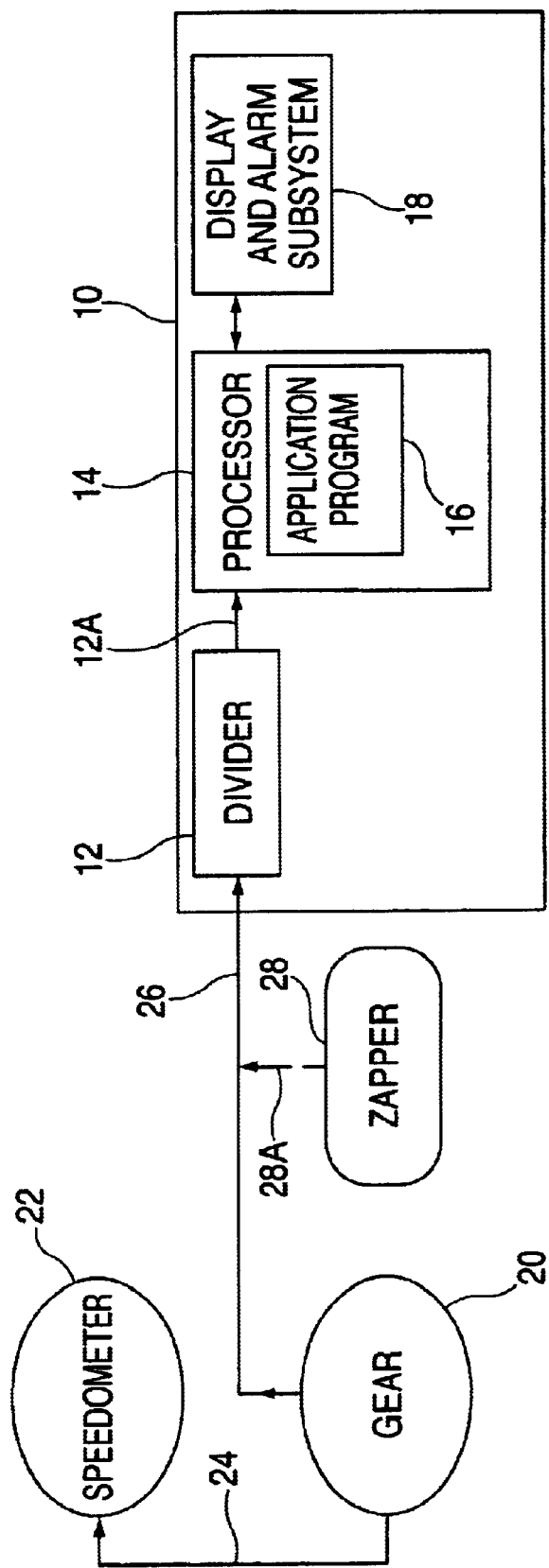
FIG. 1 is a block diagram of the system of the present invention for calculating the fare for a taxicab.

Referring to the drawings, wherein the same reference numbers indicate the same elements throughout, there is shown in FIG. 1 a block diagram of the system 10 that is capable of being mounted on a taxicab for computing the fare for a taxicab trip as a function of distance and time. The system 10 comprises a divider 12 having an output 12A and a processor 14 having an application program 16 that is of particular importance of the present invention, and preferably an alarm and display subsystem 18 that supplies inputs into the processor 14 and is responsive to the output of the processor 14.

The system 10 receives its representative time and distance inputs from a gear mechanism 20. The gear mechanism 20 has mechanical features that control the speedometer 22 of a taxicab by way of path 24, but with regard to the present invention, when the taxicab is traveling the gear mechanism 20 produces pulses and transmits the pulses 26A (to be further described with reference to FIGS. 3 and 4) to the taxi meter system 10 by way of signal path 26. As will be explained, the processor 14 uses the number of received pulses 26A for calculating the fare of the taxicab. The number of pulses generated by the gear mechanism 20 and received by the processor 14, in particular the divider 12, typically range from about 1200 to about 6000 pulses per mile of taxicab travel. This number is not constant but rather is a reflection of the taxi model and maker.

The gear mechanism 20 serves as means for generating true pulses 26A each representative of the actual distance and time traveled by the taxicab. The accuracy of the system 10, that is, the taxi meter system 10, to process such true pulses is interfered with by the illegal device sometimes referred to as a "zapper" or deceiving system 28.

The zapper 28 generates erroneous pulses 28A (to be further described with reference to FIG. 4) representative to the time traveled by the taxicab causing the system 10, without the benefits of the present invention, to incorporate a higher number of pulses into the fare calculation. As a result the passenger would otherwise be charged an incorrect fare that is higher than the amount that should be paid.

The system 10 of the present invention has dividing means 12 that divides the number of true and false pulses by a predetermined amount, such as 4, and provides an output therefrom representative of the number of true and the number of false pulses received by the divider 12 and which is applied on signal path 12A and accepted by the processor 14. The processor 14 has an application program 16 running therein that serves as the discriminating means of the present invention for receiving the output 12A of the divider 12 and detecting the contribution of the false pulses generated by the zapper 28. The application program 16 provides for an output that is used by the processor 14 for signaling the existence of false pulses.

The application program 16 of the present invention may be loaded and executed by the processor 14 which may be a conventional computer system. Upon such loading, the processor 14 becomes a primary apparatus for the practice of the present invention. The present invention can also be embodied in the form of a computer program code, for example, whether stored on a storage medium, loaded into and/or executed by a computer or transmitted over some transmission medium such as over electrical wires or cables, through fiber optics, or via electromagnetic radiation, wherein the application program 16 is loaded into and executed by a computer or processor 14.

The zapper 28 commonly produces a sequence of pulses 28A with the pulses 28A being triggered by a clock and with a constant frequency. The zapper 28 may include pulse rates in a low range from one (1) pulse per second up to four (4) pulses per second, and in a high range in excess of hundreds of pulses per second. The zapper 28 may also include an adjustment knob or modulator which enables the users, such as the taxicab driver, to modulate the rate of pulses during the trip. The zapper 28 may be operated in automatic and manual modes, wherein the automatic operation allows the zapper 28 to be operative without an operator's, such as a taxicab driver, intervention, and conversely, the manual operation allows the zapper 28 to be turned on and off by the taxicab driver or left on continuously by the taxicab driver. The zapper 28 may produce different pulse outputs which may be further described with reference to FIG. 2.

Figure 2:
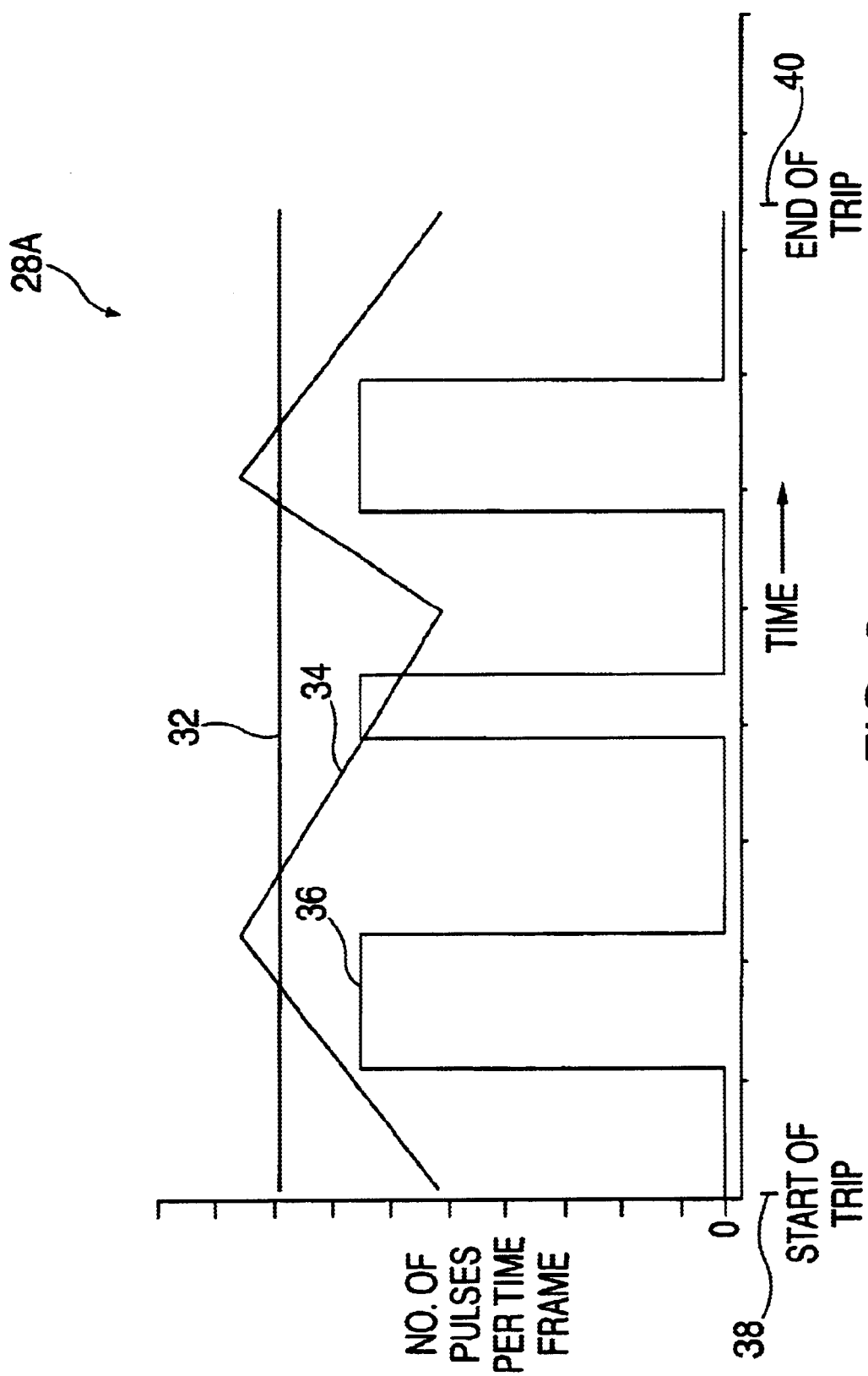
FIG. 2 illustrates the possible outputs from a device that would otherwise, without the benefits of the present invention, detrimentally effect the computations performed by the computing system of the taxi meter system.

FIG. 2 illustrates the various types of typical pulse patterns that may appear at output of the zapper 28 as pulses 28A and which may comprise three different types shown as 32, 34 and 36 each showing the pattern of different pulses initiated at the start of trip (indicated as event 38) and terminated at the end of trip (indicated as event 40). Pulse pattern 32 represents a constant rate of pulses generated by zapper 28 commonly turned on automatically when the conventional taxi meter is activated. Pulse pattern 34 represents the modulated output of zapper 28 commonly employed automatically with the activation of the conventional taxi meter. Pulse pattern 36 represents the output of zapper 28 commonly caused by the manual operation thereof allowing for the transmitting of pulses at a constant rate.

Figure 3:
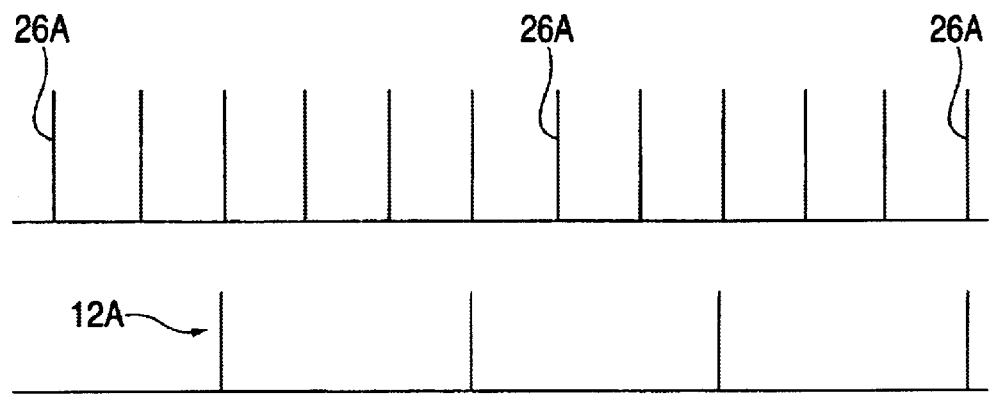
FIG. 3 illustrates the receipt and response of the divider of the present system without any contributions from erroneous sources.
Figure 4:
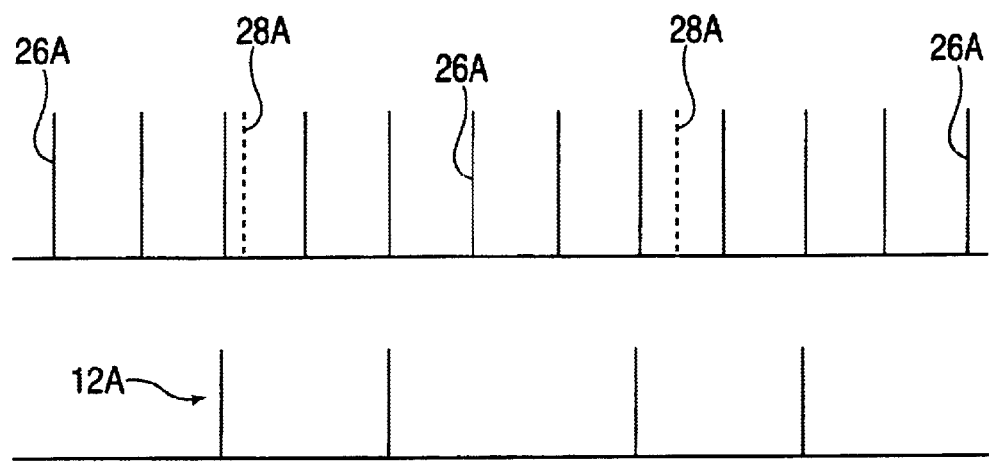
FIG. 4 illustrates the receipt and response by the divider of the present system receiving true and false pulses with the false pulses, which without the benefits of the present invention, would detrimentally effecting the calculated taxicab fare.

The response of the divider 12 to the true pulses 26A is illustrated in FIG. 3, while the response of the divider 12 to the false pulses generated by the zapper 28 is illustrated in FIG. 4.

FIG. 3 illustrates that signal path 26 as only carrying the true pulses 26A generated by the gear mechanism 20. FIG. 3 further illustrates that the divider 12 divides the number of true pulses received by a constant, e.g. three (3) so that the divider 12 provides one pulse at its output 12A for every three pulses 12A that it receives. FIG. 3 indicates that the time interval between adjacent pulses that are transmitted by the divider 12 is constant.

FIG. 4 illustrates the response of the divider 12 to both the true pulse 26A and the false pulses 28A, that is, the pulses 28A generated by the zapper 28. Again the divider 12 generates one pulse 12A for every three (including the pulses 28A) received; however, as seen in FIG. 4, when compared to the constant time interval for the pulses 12A of FIG. 3, the time interval between the output pulse 12A of FIG. 4 is disturbed because of the occurrence of the false pulses 28A. This disturbed non-constant interval, without the benefits of the present inventor, would cause incorrect taxicab fare calculations.

In general, the divider 12 transmits a pulse on signal path 12A to the processor 14 when the number of received pulses reaches its constant, that is, it generated one (1) pulses for every three (true and false) pulses that it receives. Each zapper pulse 28A will increase the number of pulses received by the divider 12 and will therefore shorten the time interval between the pulses 12A.

The time interval between adjacent gear pulses 26A on signal path 26 is constant and changes only slightly when the taxicab accelerates or decelerates. Therefore, the time intervals between the divider pulses 12A shown be constant except for the variations thereof caused by zapper pulses 28A which are not synchronized to the gear pulses 26A. The pulses 28A randomly fall between the pulses 26A generated by the gear mechanism 20 and cause random changes in the time interval between divider pulses 12A. The present invention provides for discriminating means that detect the contribution of the zapper pulses 28A to those pulses 12A acted upon by the processor 14. The discriminating means comprises the application program 16 which is represented by a flow chart 42 that indicates the overall operation of the application 16 and is shown in FIG. 5 which indicates program segments that are given in Table 1.

TABLE 1

| Program Segment | Nomenclature |
|---|---|
| 44 | Detection of pulses |
| 46 | Detection of more than 4 accelerations during one minute, which are higher that 3 m/sec² |
| 48 | Detection of velocity increases by more that 10 MPH (miles per hour) within one second (acceleration of ~4.5 m/sec²) |
| 50 | Detection of pulse rates which are normally expected at very high speeds (e.g. more than 100 MPH). |
| 52 | Detection of pulse rates which are constant for a relatively long period (e.g. 1 minute) |
| 54 | Alarm response |

Figure 5:
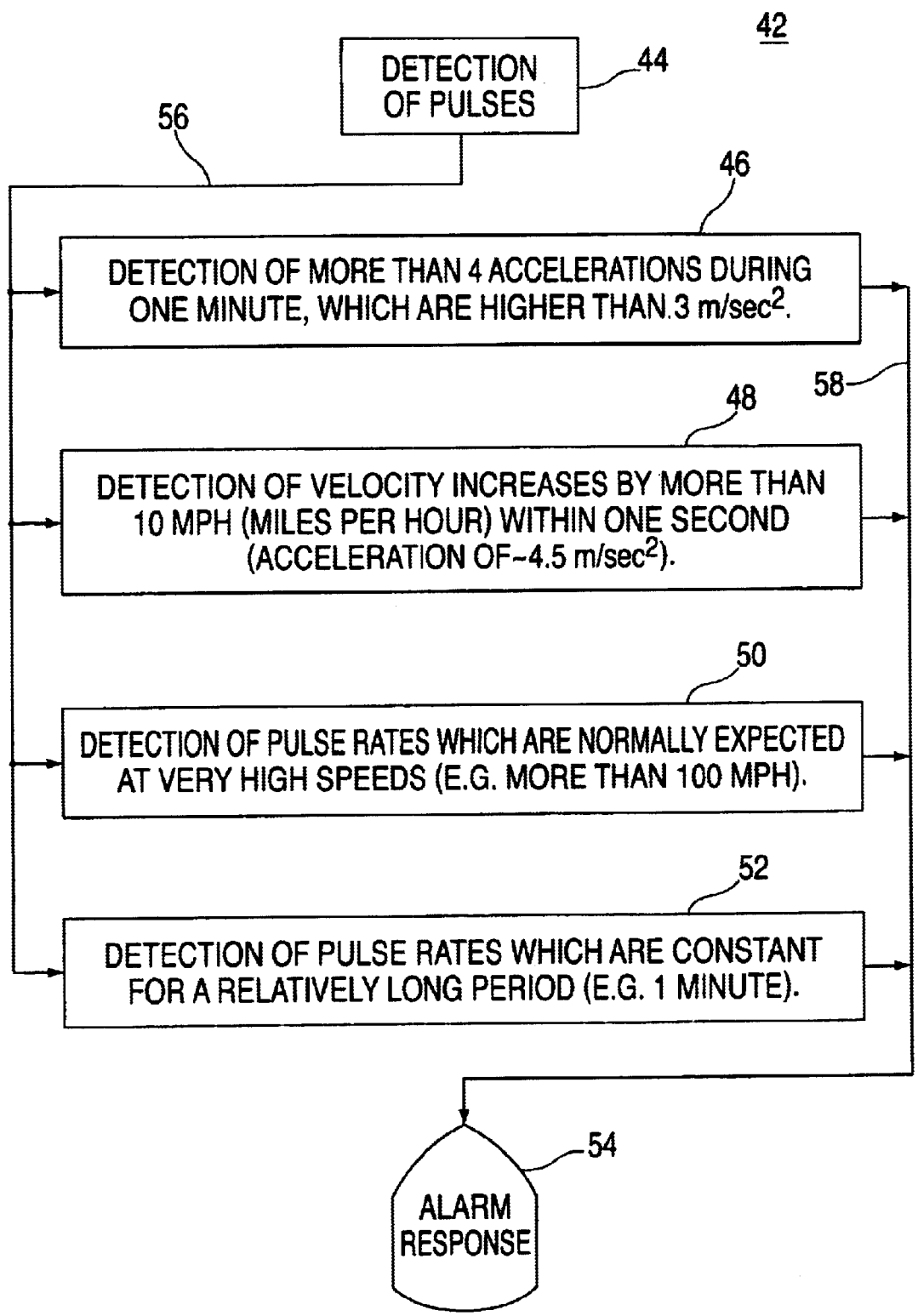
FIG. 5 is a flow chart showing the overall operation of the discriminating means of the present invention.

In general, upon the detection of pulses (includes both true 26A and false 28A) indicated by the event 44 of FIG. 5, the application program 16 activates signal path 56, which in turn activates program segments 46, 48, 50 and 52, and if either of these program segments 46, 48, 50 or 52 detects its predetermined alarms condition, the alarm notification thereof is placed on signal path 58 which, in turn, causes the alarm response 54 to be activated. The alarm response 54 is by way of the display and alarm subsystem 18 of FIG. 1 which may be a conventional device that generates appropriate visual or audio alarms or registers the alarm response 54 in a processing unit (not shown).

The program segment 46 provides means for detecting pulses representative of more than four taxicab acceleration occurrences during a one minute period which are higher that an acceleration of the taxicab of 3 m/sec$^2$. To better appreciate that 3 m/sec$^2$ acceleration, referenced is made to Table 2 giving the velocity and distance traveled for a taxicab accelerating at a rate of 2 m/sec$^2$, reaching a velocity of 72 Km per hour (45MPH), and then traveling at a constant rate of speed.

TABLE 2

| time (sec) | velocity (m/sec) | velocity (km per hour) | distance (m) |
|---|---|---|---|
| 0 | 0 | 0 | 0 |
| 1 | 2 | 7.2 | 1 |
| 2 | 4 | 14.4 | 4 |
| 3 | 6 | 21.6 | 9 |
| 4 | 8 | 28.8 | 16 |
| 5 | 10 | 36 | 25 |
| 6 | 12 | 43.2 | 36 |
| 7 | 14 | 50.4 | 49 |
| 8 | 16 | 57.6 | 64 |
| 9 | 18 | 64.8 | 81 |
| 10 | 20 | 72 | 100 |
| 11 | 20 | 72 | 120 |
| 12 | 20 | 72 | 140 |
| . | . | . | . |
| . | . | . | . |
| . | . | . | . |
| 60 | 20 | 72 | 1100 |

Under normal conditions experienced by moving taxicabs, the time intervals between legal adjacent divider pulses 12A caused by true pulses 26A will at most, differ by only 0–1 milliseconds between each other. Accordingly, under these radical accelerations of 3 m/sec$^2$, zapper pulses 28A will cause adjacent intervals between pulses 12A to vary by 4–5 milliseconds. If all accelerations of taxicab between consecutive pulses are computed without the benefit of the present invention, zapper pulses 28A will causes multiple detections of accelerations of 20–40 m/sec$^2$ each minute. Such accelerations are not physically feasible because accelerations during a taxi trip will not exceed 2–3 m/sec$^2$, and even their number is not expected to be greater than 1–2 per minute.

The measuring resolution in the taxis meter system 10 of the present invention is typically in the order of 1 millisecond. The intervals between pulses 28A in a high rate zapper (500 pulses and more) are less than 2 milliseconds. Therefore, for a high rate zapper, it becomes increasingly more difficult to confidently resolve differences in intervals and the related accelerations. Thus, the criterion of program segment 46 of FIG. 5 is particularly suited for lesser rate or normal zappers 28, whereas the high rate zappers 28 are handled more advantageously by program segment 48 to be described.

Under normal conditions (no zapper pulses 28A) the pulses 26A being received by divider 12 and divided and transmitted on signal path 12A, is about 1000 pulses per Km (1600 pulses per mile) and creates time intervals of 50–100 millisecond when velocities are greater that 45 Km per hour (approximately 30 miles per hour). Under normal conditions that intervals between adjacent pulses 12A is at most different from each other by 0–1 milliseconds.

The program segment 48 detects pulses representative of velocity increases by the taxicab of more than ten miles per hour within one second. When the zapper 28 is activated, the rate of pulses increase immediately to a higher rate (which is the sum of the legal pulses 26A from the gear mechanism 20 and the illegal pulses 28A from the zapper 28). These increases can be detected by comparing the number of pulses between short consecutive time steps such as those shown in Table 2. The number of possible increases that the processor 14 could receive by the unwanted contribution of the pulses 28A from the zapper 28 in the order of ten seconds, is shown in Table 3.

TABLE 3

| zapper's 28 frequency (pulses per second) | increase in number of pulses 28A sensed by the processor 14 (pulses per second) | related increase in velocity (Km/hr) |
|---|---|---|
| 100 | 10 | 36 |
| 300 | 30 | 108 |
| 500 | 50 | 180 |
| 1,000 | 100 | 360 |

From Table 3 it may be determined that the zapper 28 may cause a difference in the number of pulses, between two consecutive one second time intervals, that is equivalent to an increase of 18–36 Km/hr (11–22 miles per hour) in velocity within one (1) second. Such an increase is equivalent to an acceleration of 5–10 m/sec$^2$, which is not physically possible to be experienced by a taxicab. A higher zapper rate handled by program segment 48 (detection of velocity increases by more than 10 MPH within 1 second) results in higher and more exceptional differences in velocity between consecutive time steps.

Program segment 50, in addition to the safeguards of the program segments 46 and 48, provides for the identification of exceptional velocities that are caused when the zapper 28 is activated. A rapidly operated zapper 28 (with hundred of pulses and more per second) will force a very high rate of pulses into the processor 14 and cause increases in the number of zapper pulses 28A, in a manner as shown in Table 4.

TABLE 4

| adjacent intervals (milliseconds) | related velocities (m/sec) | related velocities (km/hr) | maximum acceleration |
|---|---|---|---|
| 50-45-50-50 | 20-22-20-20 | 72-80-72-72 | 40 m/sec$^2$ |
| 50-47.5-47.5-50 | 20-21-21-20 | 72-76-76-72 | 20 m/sec$^2$ |

From Table 4 it may be determined that the increase in velocity when such a zapper 28 is activated is very high. Comparing the number of pulses in consecutive time steps of 1 second will show a difference in velocity by at least 18 Km/hr between two consecutive time steps for such a zapper 28 activation.

As illustrated in Table 4, 50 pulses per seconds into the processor 14 are equivalent to a velocity of 112 miles per hour. Higher rates are equivalent to higher velocities. Such velocities are not expected during a taxicab trip. Therefore, the program segment 50 detection of such high pulses rates is used as a criterion for the presence of the zapper 28 and for the generation, by way of signal path 58 (which is also activated by program segments 46, 48, and 50) of the response (audible or visual) by alarm response 54.

Program segment 52, in addition to the safeguards provided by program segments 46, 48 and 50, provides for the detection of pulses having pulse rates which are abnormally constant. More particularly, pulses rates that are constant for a relatively long period (e.g. 1 minute) are considered to be abnormal. The pulses 28A of the zapper 28 are typically triggered by a clock and the intervals between the pulses 28A are substantially identical (can be measured in microseconds). During a normal taxicab drive, even at a constant speed, slight variations are normally expected between adjacent and legal pulses 26A intervals however; when the taxicab is not moving and the zapper 28 is operating, the processor 14, in particular program segment 52, receives only the zapper pulse, i.e. pulses 28A with very constant and identical intervals (measured in microseconds) therebetween. Such an occurrence is not expected during a normal trip and the detection of many consecutive identical intervals with relatively long periods of time (e.g. one minute) is used by program segment 52 as an indication of the presence of zapper 28. Upon such a detection, the alarm response 54 is activated by program segment 52 by way of signal path 58.

It should now be appreciated that the practice of the present invention provides for a system 10 that detects the presence of false pulses 28A, generated by zapper 28.

Although certain features of the invention have been illustrated and described therein, better modifications and changes will occur to those skilled in the art. It is, therefore, to be understood that the appended claims are intended to cover all such modification and changes that fall within the spirit of the invention.

We claim:

1. A system mounted on the taxicab for detecting false or illegal pulses to a taxicab fare system that computes the fare for a trip as a function of distance and time, comprising:
   (a) means for generating true pulses each representative of the actual distance and time traveled by said taxicab;
   (b) means for receiving said true pulses as well as being capable of receiving false pulses erroneously representative of distance and time traveled by said taxicab;
   (c) means for dividing the number of true and false pulses by a predetermined amount and providing an output therefrom;
   (d) discriminator means for receiving said output of said means for detecting the presence of said false pulses from said output therefrom; and
   (e) alarm means for indicating the detection of said false pulses;
   (f) wherein said discriminator means comprises:
      (i) means for detecting pulses representative of more that four taxicab acceleration occurrences during one minute, each of said accelerations being greater than an acceleration by said taxicab of 3 m/sec$^2$;
      (ii) means for detecting pulses representative of velocity increases by said taxicab of more than 10 MPH (miles per hour) within one second;
      (iii) means for detecting pulses having pulse rates representative of speeds being traveled by said taxicab which are greater than about 100 MPH; and
      (iv) means for detecting pulses having pulse rates which are constant for a period of about one minute and greater.

2. A computer program encoded on computer readable medium used in a system for detecting false or illegal pulses to a taxicab fare system that computes the fare for a trip as a function of distance and time wherein the system is responsive to true pulses representative of the actual time and distance traveled by said taxicab and to false pulses erroneously representative of time and distance traveled by said taxicab, said computer program detecting the presence of said false pulses to said computing of said fare and comprising:
   (a) means for detecting pulses representative of more that four taxicab acceleration occurrences during one minute, each of said accelerations being greater than an acceleration by said taxicab of 3 m/sec$^2$;
   (b) means for detecting pulses representative of velocity increases by said taxicab of more that 10 MPH (miles per hour) within one second;
   (c) means for detecting pulses having pulse rates representative of speeds being traveled by said taxicab which are greater than about 100 MPH (miles per hour);
   (d) means for detecting pulses having pulse rates which are constant for a period of about one minute and greater; and
   (e) alarm means for indicating the detection of said false pulses.

3. A method performed in a computer used in a system for computing the fare for a trip as a function of distance and time, wherein the system is responsive to true pulses representative of the actual time and distance traveled by said taxicab and to false pulses erroneously representative of time and distance traveled by said taxicab, said method detecting the presence of said false pulses to said computing of said fare and comprising the steps of:
   (a) detecting pulses representative of more than four taxicab acceleration occurrences during one minute, each of said accelerations being greater than an acceleration by said taxicab of 3 m/sec$^2$;
   (b) detecting pulses representative of velocity increases by said taxicab of more that 10 MPH (miles per hour) within one second;
   (c) detecting pulses having pulse rates representative of speeds being traveled by said taxicab which are greater than about 100 MPH (miles per hour) and greater;
   (d) detecting pulses having pulse rates which are constant for a period of about one minute and greater; and
   (e) alarm means for indicating the detection of said false pulses.

4. A computer readable substrate having a computer program saved thereupon and used in a system for computing the fare for a trip as a function of distance and time, wherein the system is responsive to true pulses representative of the actual time and distance traveled by said taxicab and to false pules erroneously representative of time and distance traveled by said taxicab, said computer program detecting the presence of said false pulses to said computing of said fare and comprising the steps of:
   (a) means detecting pulses representative of more than four acceleration occurrences during one minute each of said accelerations being greater than an acceleration by said taxicab of 3 m/sec$^2$;
   (b) detecting pulses representative of velocity increases by said taxicab of more than 10 MPH (miles per hour) within one second;
   (c) detecting pulses having pulse rates representative of speeds being traveled by said taxicabs which are greater than about 100 MPH (miles per hour);
   (d) detecting pulses having pulse rates which are constant for a period of about one minute and greater; and
   (e) alarm means for indicating the detection of said false pulses.

5. An system mounted on the taxicab for detecting false or illegal pulses to a taxicab fare system that computes the fare for a trip as a function of distance and time, comprising:
   (a) means for detecting false pulses representative of more than four taxicab acceleration occurrences during one minute, each of said accelerations being greater than an acceleration by said taxicab of 3 m/sec$^2$;

(b) means for detecting false pulses representative of velocity increases by said taxicab of more that 10 MPH (miles per hour) within one second;

(c) means for detecting false pulses having pulse rates representative of speeds being traveled by said taxicab which are greater than about 100 MPH (miles per hour);

(d) means for detecting false pulses having pulse rates which are constant for a period of about one minute and greater; and (e) alarm means for indicating the detection of said false pulses.

6. The system as in claim 5 further comprising processor means for registering the detection of said false pulses.

7. The system as in claim 1 further comprising processor means for registering the detection of said false pulses.

8. The computer program as in claim 2 further comprising means for registering the detection of said false pulses.

9. The method as in claim 3 further comprising the steps of registering the detection of said false pulses.

10. The computer readable substrate as in claim 4 further comprising the steps of registering the detection of said false pulses.

11. A system mounted on the taxicab for detecting false or illegal pulses to a taxicab fare system that computes the fare for a trip as a function of distance and time, comprising:

(a) means for generating true pulses each representative of the actual distance and time traveled by said taxicab;

(b) means for receiving said true pulses as well as being capable of receiving false pulses erroneously representative of distance and time traveled by said taxicab;

(c) means for dividing the number of true and false pulses by a predetermined amount and providing an output therefrom;

(d) discriminator means for receiving said output of said means for detecting the presence of said false pulses from said output therefrom; and (e) alarm means for indicating the detection of said false pulses;

(f) wherein said discriminator means comprises means for detecting pulses having pulses rates which are constant for a period of about one minute and greater.

12. The system as in claim 11 further comprising processor means for registering the detection of said false pulses.

* * * * *